US008726586B1

(12) United States Patent
Stevens et al.

(10) Patent No.: US 8,726,586 B1
(45) Date of Patent: May 20, 2014

(54) ENERGY-EFFICIENT BUILDING STRUCTURE HAVING A DYNAMIC THERMAL ENCLOSURE

(71) Applicants: Kirk Russell Stevens, Chicago, IL (US); Sheryl O'Reilly Stevens, Chicago, IL (US); Kelsey O'Reilly Stevens, Chicago, IL (US); Patrick Francis O'Reilly, Jr., Westerville, OH (US); Patrick Francis O'Reilly, III, Columbus, OH (US)

(72) Inventors: Kirk Russell Stevens, Chicago, IL (US); Sheryl O'Reilly Stevens, Chicago, IL (US); Kelsey O'Reilly Stevens, Chicago, IL (US); Patrick Francis O'Reilly, Jr., Westerville, OH (US); Patrick Francis O'Reilly, III, Columbus, OH (US)

( * ) Notice: Subject to any disclaimer, the term of this patent is extended or adjusted under 35 U.S.C. 154(b) by 0 days.

(21) Appl. No.: 13/733,872

(22) Filed: Jan. 3, 2013

Related U.S. Application Data

(60) Provisional application No. 61/583,153, filed on Jan. 4, 2012.

(51) Int. Cl.
*E04D 13/18* (2006.01)
*E04B 1/70* (2006.01)
*F24F 11/00* (2006.01)

(52) U.S. Cl.
USPC ......... 52/173.1; 52/302.1; 126/621; 126/628; 454/239

(58) Field of Classification Search
CPC ........ Y02B 10/24; Y02B 30/92; Y02E 10/44; F24F 5/0046; F24F 2005/0064; F24F 7/02; F24D 11/007; F24J 2/045
USPC ............. 52/1, 302.1, 198, 199; 454/239–242, 454/250–253, 258; 700/278; 126/621, 628
See application file for complete search history.

(56) References Cited

U.S. PATENT DOCUMENTS

| 2,680,565 | A | * | 6/1954 | Lof | 126/591 |
| 3,027,090 | A | * | 3/1962 | Zerhan, Jr. | 236/49.5 |
| 4,103,825 | A | * | 8/1978 | Zornig | 126/632 |
| 4,180,055 | A | * | 12/1979 | Hudnall | 126/658 |
| 4,193,390 | A | * | 3/1980 | Hatten | 126/628 |
| 4,263,894 | A | * | 4/1981 | Zebuhr | 126/583 |
| 4,437,511 | A | * | 3/1984 | Sheridan | 165/48.2 |
| 4,497,311 | A | * | 2/1985 | Brandenburg, Jr. | 126/606 |
| 4,552,205 | A | * | 11/1985 | Saunders | 165/236 |
| 5,014,770 | A | * | 5/1991 | Palmer | 165/48.2 |
| 6,319,115 | B1 | * | 11/2001 | Shingaki | 454/186 |
| 6,792,938 | B2 | * | 9/2004 | Komano et al. | 126/597 |

(Continued)

FOREIGN PATENT DOCUMENTS

| JP | 59138836 | A | * | 8/1984 | F24F 3/00 |
| JP | 2012211451 | A | * | 11/2012 | |

*Primary Examiner* — Elizabeth A Plummer
(74) *Attorney, Agent, or Firm* — The Law Office of Patrick F. O'Reilly, III, LLC

(57) ABSTRACT

A constructed enclosure, adjacent to an interior habitable space, uses a microprocessor-based control unit to operate enclosure openings to provide a multi-layer insulation barrier containing or creating heat, or providing a radiant barrier, isolating by open air, a thermal insulating layer from warm exterior surfaces, maximizing insulation values. The enclosed space, through the use of openings, which in one embodiment are windows, skylights and dampers connected to louvers, is heated by radiant exposure or cooled by natural air flow or exhaust fan. Return air is heated upstream from a forced air heating unit by traversing ductwork heated by the enclosure and by direct solar exposure from enclosure windows. Enclosure openings to the habitable interior spaces create air displacement drawing warm air out of the interior and fresh air in through exterior windows. The energy efficient system is tailored for immediate climate specific conditions.

21 Claims, 13 Drawing Sheets

(56) References Cited

U.S. PATENT DOCUMENTS

| | | |
|---|---|---|
| 7,497,774 B2 | 3/2009 | Stevenson et al. |
| 7,507,151 B1 | 3/2009 | Parker et al. |
| 7,758,408 B2 | 7/2010 | Hagentoft |
| 8,152,608 B1 * | 4/2012 | Hamby .......................... 454/251 |
| 8,368,240 B1 * | 2/2013 | Burkett ........................... 290/44 |
| 2002/0117166 A1 * | 8/2002 | Okumura ...................... 126/633 |
| 2011/0146939 A1 * | 6/2011 | Bond et al. ...................... 165/10 |
| 2011/0172832 A1 * | 7/2011 | Kirby et al. .................... 700/278 |
| 2011/0223850 A1 * | 9/2011 | Narayanamurthy et al. . 454/239 |
| 2011/0238223 A1 * | 9/2011 | Narayanamurthy et al. . 700/277 |
| 2011/0257795 A1 * | 10/2011 | Narayanamurthy et al. . 700/277 |
| 2012/0024343 A1 * | 2/2012 | Narayanamurthy .......... 136/246 |
| 2012/0186778 A1 * | 7/2012 | Hollick ............................ 165/47 |
| 2012/0295534 A1 * | 11/2012 | Narayanamurthy et al. . 454/256 |

* cited by examiner

ENERGY-EFFICIENT BUILDING STRUCTURE HAVING A DYNAMIC THERMAL ENCLOSURE

CROSS-REFERENCE TO RELATED APPLICATIONS

This patent application claims priority to, and incorporates by reference in its entirety, pending U.S. Provisional Patent Application No. 61/583,153, entitled "An Energy-Efficient Building Structure Having A Dynamic Thermal Enclosure", filed on Jan. 4, 2012.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

INCORPORATION BY REFERENCE OF MATERIAL SUBMITTED ON A COMPACT DISK

Not Applicable.

BACKGROUND OF THE INVENTION

1. Field of the Invention

This invention relates generally to heating, cooling and ventilation systems for building structures, and more particularly, relates to the creation of an enclosure, which through the specific attributes of the envelope, aids with the space conditioning of the interior habitable spaces.

2. Background and Description of Related Art

There are buildings with roof systems which are designed to utilize solar exposure or to isolate the exposure to help regulate interior temperatures. There are also buildings that implement a passive solar strategy to help heat the interior. Some energy efficient buildings use heat recovery systems that use heat transfer to precondition air to lower loads on heating units.

While a passive solar approach is beneficial, it is difficult to implement given the need for direct solar exposure on high heat mass materials and the need to control the heat released from the material. There are issues of occupant discomfort from heat and glare in interior spaces with intense solar exposure. The sun can also damage interior finishes. Utilizing a passive solar approach to move heat between spaces horizontally or by providing walls that absorb solar heat tend to block views from the interior spaces and can, in certain situations, actually reduce interior light levels. Energy efficient buildings that heat air sandwiched between high thermal mass walls and exterior windows while passively heating air are subject to molds and dirt because the air space is hard to access.

Typically, in buildings, there is a single insulating layer between the interior habitable spaces and exterior air. There are cool roof designs where the roof surface floats above the insulating layer which is beneficial in warm climates and there are warm roof designs that use the sun to heat the roof surface which is beneficial in cold climates.

What is needed is an enclosure system, separate from habitable spaces, that can be opened or closed, depending upon immediate environmental conditions, to aid with the thermal conditioning of interior spaces. Typical single layer insulating systems are not flexible in that they only provide a thermal barrier as opposed to a multilayer enclosure utilizing the enclosed space to either contain air for additional insulation or to induce air movement into and out of the enclosure to draw warm air from the interior and to isolate a warm roof surface from interior spaces. A typical passive solar heating approach has the potential to create occupant discomfort while the sun warms heat absorbing materials. Thus, what is needed is a dynamic enclosure that radiantly heats air in a separate space and then transfers the heated air to the interior in a controlled fashion via a furnace or heat pump.

BRIEF SUMMARY OF THE INVENTION

Accordingly, the present invention is directed to an energy-efficient building structure having a dynamic thermal enclosure that substantially obviates one or more problems resulting from the limitations and deficiencies of the related art.

The preferred embodiments of the present invention provide a constructed space that serves as an insulating layer for habitable spaces, an air displacement mechanism that facilitates the removal of warm air from the habitable interior and a structure that provides preheated air to a forced air heating system via solar radiantly heated ductwork. The insulating layer where one preferred embodiment provides a location in a space at the top of a building traditionally referred to as an "attic" provides an insulated roof plane, insulated wall plane, an insulated floor plane and the insulating contained air space. Acting as a single unit the insulating planes and space provide superior insulation when compared to structures where a single plane acts as a thermal barrier. The penetrations in the constructed space are comprised of remote controlled motorized high performance windows, skylights and dampers connected to louvers, control air movement in and out of the space drawing warm air from the interior and exhausting warm interior air to the exterior during periods when fresh outdoor air is desired. Preferably, the motorized remote controlled elements that control air movement are operated by a central microprocessor control unit connected to a roof top anemometer that measures wind speed and direction to determine the degree of opening for optimal air flow. Roof overhangs and window orientation in the constructed space enables solar radiation to heat return air ducts and ceramic tile over a high thermal mass mortar bed providing pre-heated air to a forced air heating system during heating periods and blocks solar radiation from warming the ductwork and space during the cooling season. When space conditioning requirements do not require preheated return air, dampers redirect the return air path to avoid the radiant ductwork loop. Preferably, the enclosed space is equipped with temperature and humidity sensors to optimize thermal performance and combined with a fan system to automatically remove excess humidity. In another embodiment the return air ducts that are heated radiantly shall be equipped with radiant heat fins that effectively increase the solar radiant exposure to increase the radiant heat to the duct material. Preferably, a solar hot water system is connected to a preheat coil on the return air lines upstream of the heating unit. Likewise, preferably, a ground source geothermal system heat pump shall provide heat transfer between interior spaces and the surrounding earth used mainly during cooling periods.

It is to be understood that the foregoing general description and the following detailed description of the present invention are merely exemplary and explanatory in nature. As such, the foregoing general description and the following detailed description of the invention should not be construed to limit the scope of the appended claims in any sense.

BRIEF DESCRIPTION OF THE SEVERAL VIEWS OF THE DRAWINGS

The invention will now be described, by way of example, with reference to the accompanying drawings, in which.

Throughout the figures, the same parts are always denoted using the same reference characters so that, as a general rule, they will only be described once.

DETAILED DESCRIPTION OF THE PREFERRED EMBODIMENTS OF THE INVENTION

Figure 1:
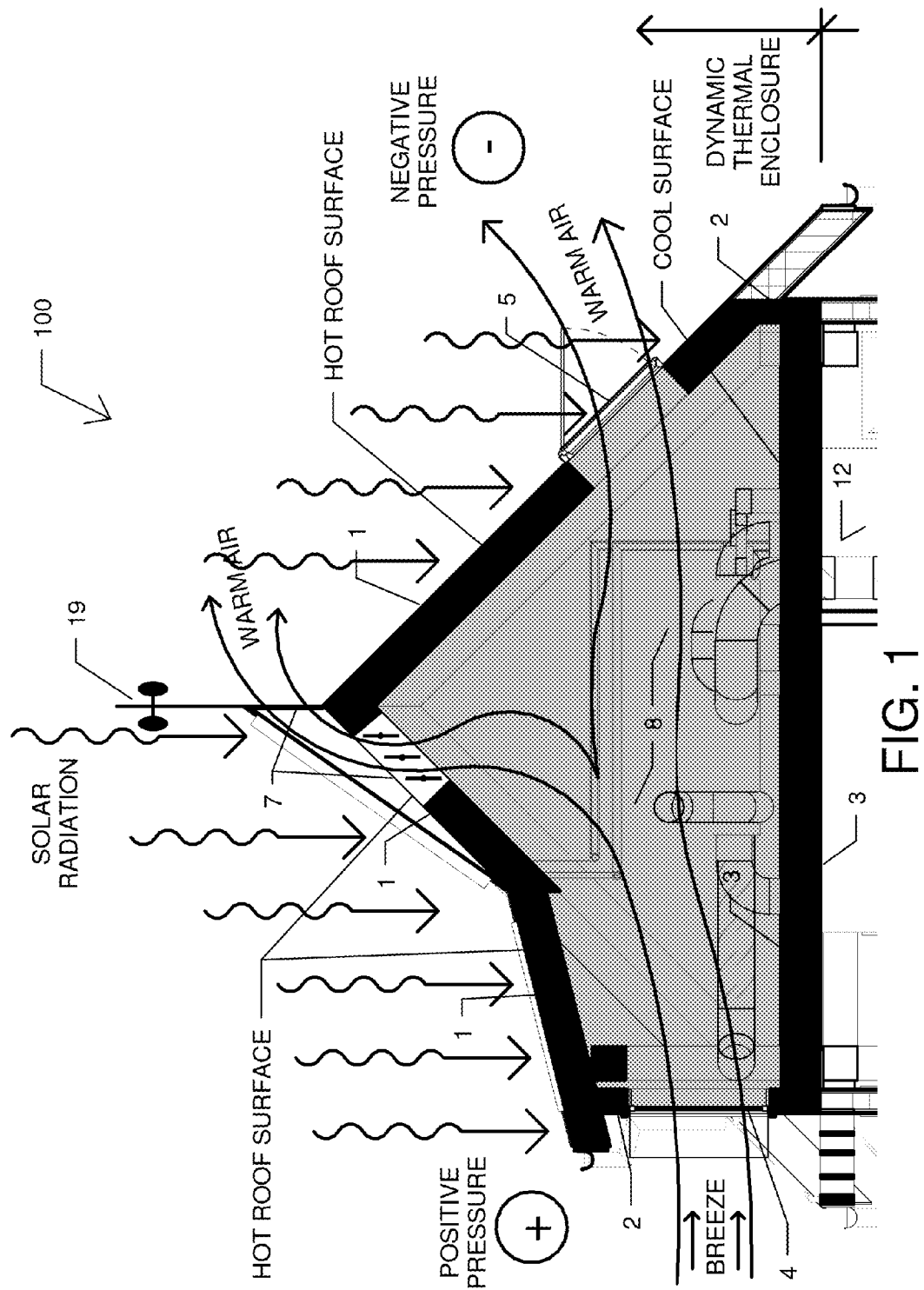
FIG. 1 is a partial transverse sectional view of the dynamic thermal enclosure system according to an embodiment of the present invention with the system being depicted in a cooling/ventilating mode.
Figure 9:
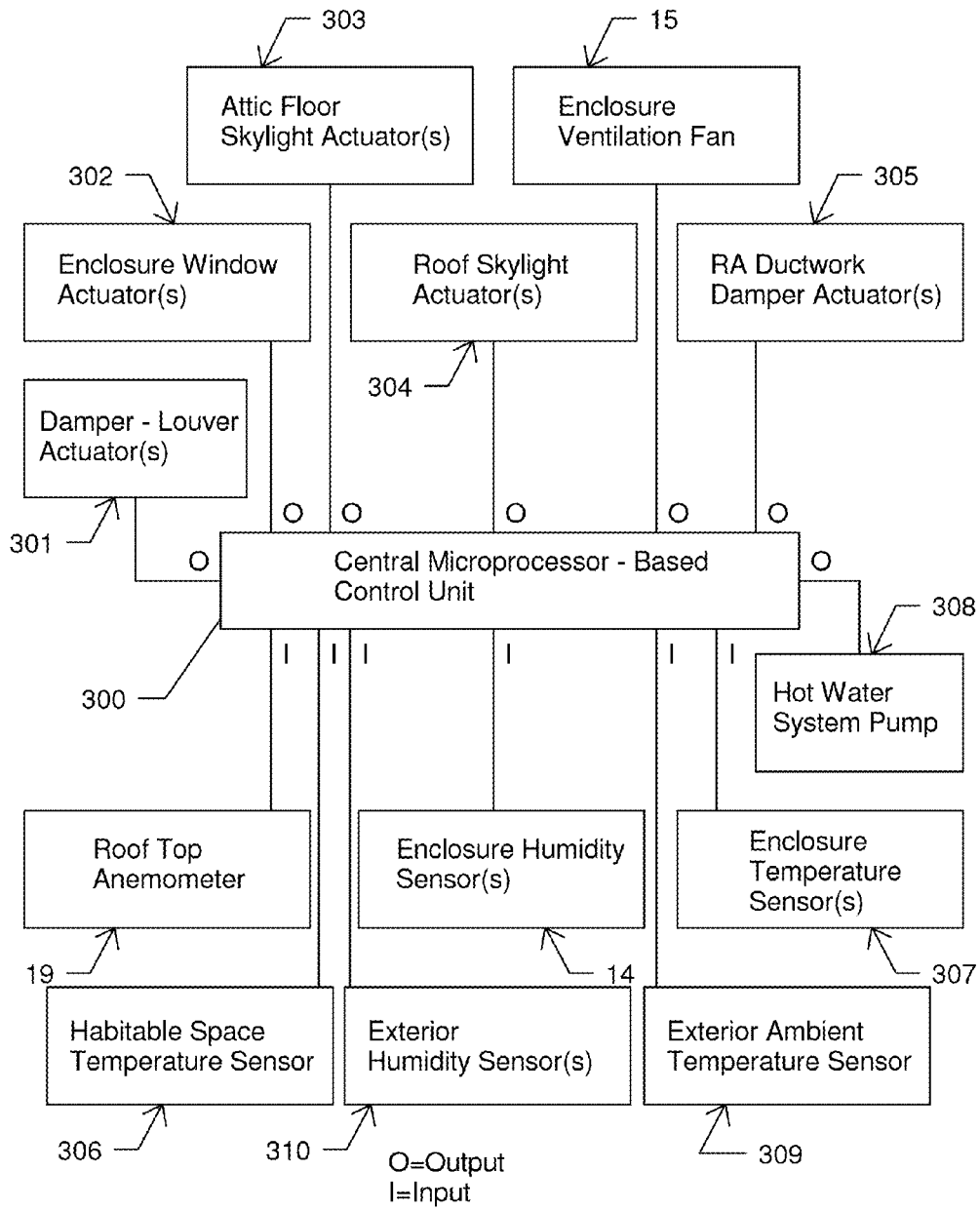
FIG. 9 is a block diagram of an automatic control system used in conjunction with the dynamic thermal enclosure according to an embodiment of the present invention.

Referring to FIG. 1, the system 100 generally comprises the creation of an enclosure adjacent to a habitable building envelope for the primary purpose of aiding with the temperature conditioning of interior air. The enclosure which in this embodiment would be typically referred to as an "attic", comprises outer insulating layers, in this embodiment being an insulated roof 1, insulated walls 2 and a layer between the enclosure and the habitable interior building spaces 12, being an insulated floor 3. Openings within these layers, in this embodiment being comprised of remote control insulating "attic" windows 4, roof skylights 5, "attic" floor mounted skylights 6 (see FIG. 2) and insulated dampers connected to louvers 7, provide thermal control of the space. In cooling periods, as illustrated in FIG. 1, the "attic" windows 4, roof skylights 5 and as needed insulated dampers connected to louvers 7 open to provide through air flow to keep the enclosed space 8 and "attic" floor layer 3 cool. To control air flow, in a preferred embodiment, a rooftop anemometer 19 provides wind speed and wind direction information to the central microprocessor based control unit 300 (see FIG. 9) controlling the percentage of opening for each unit.

In one exemplary embodiment of the invention, the central microprocessor-based control unit 300 controls the opening of "attic" windows 4, roof skylights 5, and louvers 7 in accordance with the following procedure. For enclosure cooling, the windward enclosure openings should be equal to or less than the leeward enclosure openings to avoid turbulence and so that the maximum wind speed occurs within the enclosure providing greater cooling while allowing warmer air to escape. If the leeward side has 10 operable skylights 5 with a maximum of 58.4 square feet of free ventilation area and on the windward side there are ten operable windows 4 with a maximum of 125.5 square feet of free ventilation area, the windward windows 4 should be opened approximately 46.5% of the maximum opening area if the skylight openings 5 are opened fully. With louvers 7 opening to the leeward exposure with a total free area of 67.1 square feet, balancing the windward and leeward exposures, all the enclosure windows 4, enclosure skylights 5 and enclosure louvers 7 can be opened fully maximizing the air flow through the enclosure. Reducing the windward free area in relation to the leeward exposure can channel winds at higher velocities.

Figure 2:
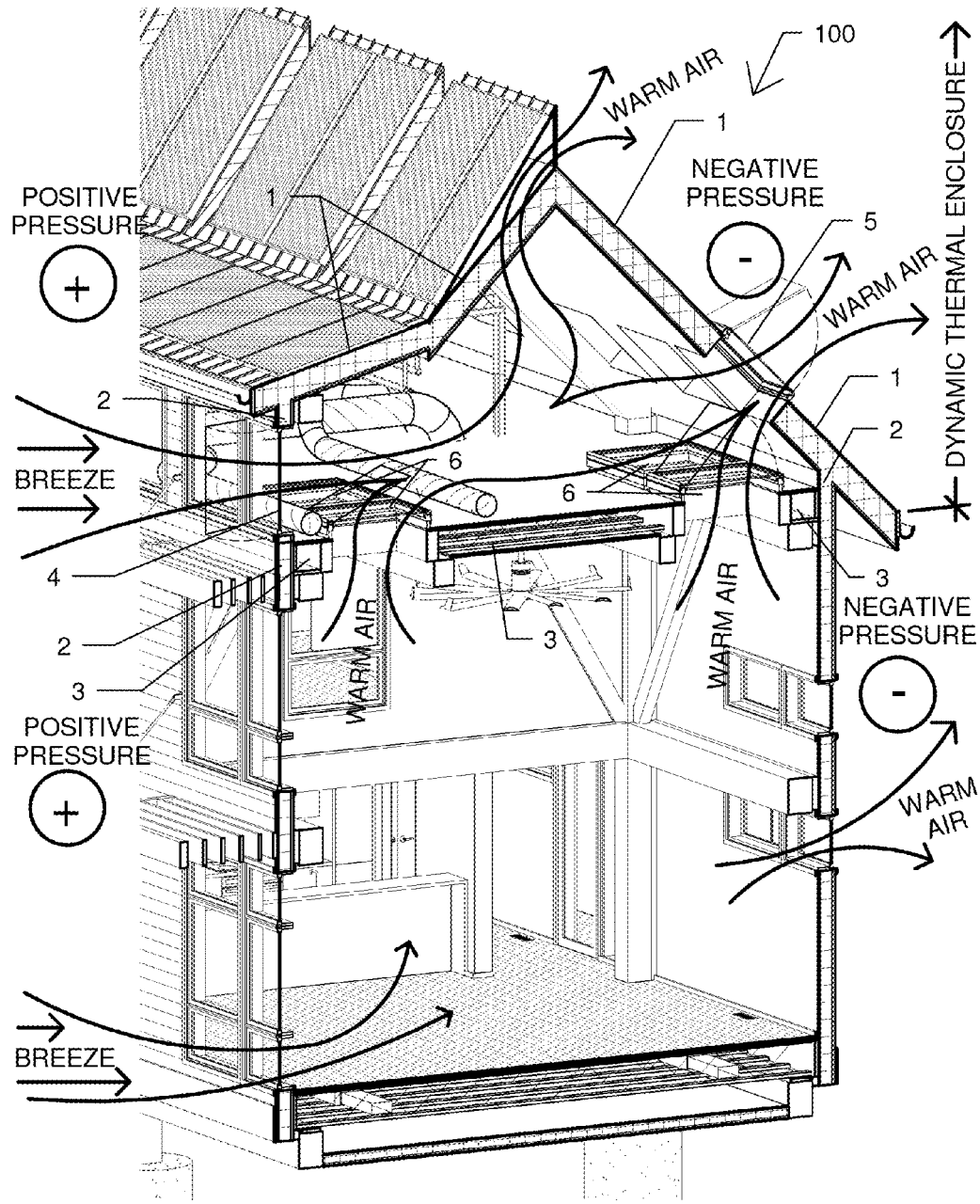
FIG. 2 is a perspective sectional view of the dynamic thermal enclosure system according to an embodiment of the present invention with the system being depicted in a cooling/ventilation mode.

In one embodiment, the insulating "attic" windows 4 are either casement or awning and are equipped with an electric opener (enclosure window actuator 302) in the form of an electric motor that turns the window crank or turns a gear on an arm that opens or shuts the window 4. Various window manufacturers provide remote openers as accessory items. Various skylight manufacturers offer remote opening units as well. Both the "attic" windows 4 and the roof skylights 5 are controlled by a microprocessor based control unit 300 by means of their respective enclosure windows actuator 302 and roof skylight actuator 304. Similarly, the attic floor skylights 6 with actuators 303 are controlled by the central microprocessor based central unit 300. The louvers with motorized dampers 7 tied to the air passage connecting the louvers to the dynamic thermal enclosure would also be controlled by the microprocessor based control unit 300 by virtue of damper louver actuators 301. Preferably, the roof skylights 5 and "attic" windows 4 would be equipped with motorized shades 23 (see FIGS. 13 & 14) so that solar radiation is blocked from the enclosure during cooling periods. In the system 100, when natural interior ventilation is desired, the "attic" windows 4, roof skylights 5, "attic" floor skylights 6 and when needed for additional capacity, the insulated louvers 7, open to draw warm air out of the interior by convective air flow and through air displacement as seen in FIG. 2.

Figure 3:
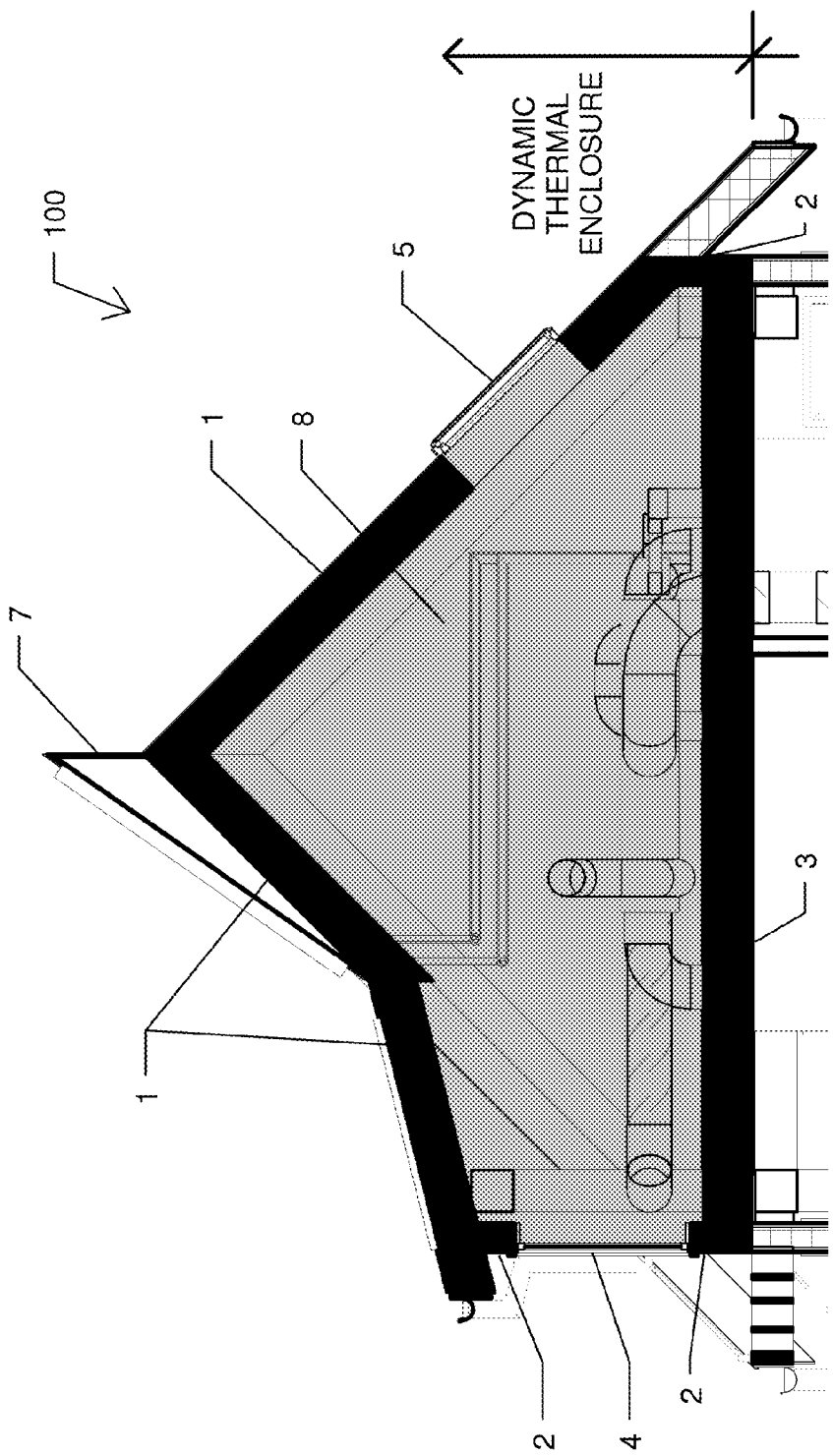
FIG. 3 is a partial transverse sectional view of the dynamic thermal enclosure system according to an embodiment of the present invention, with the system being depicted in a mode where an extreme differential exists between the inside and outside temperatures.
Figures 13, 14:
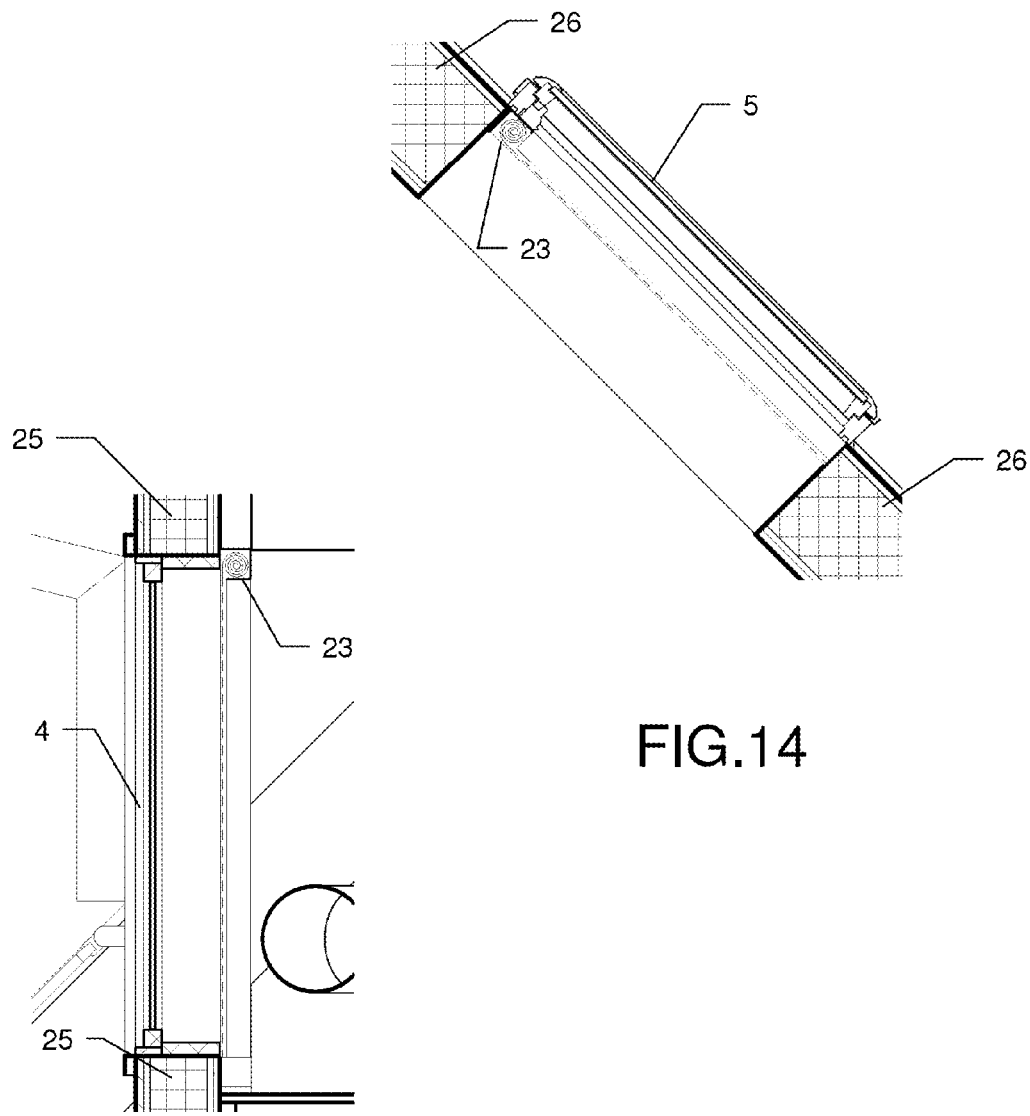
FIG. 13 is a partial transverse sectional view of the dynamic thermal enclosure system through an operable window with motorized shades according to an embodiment of the present invention.
FIG. 14 is a partial transverse sectional view of the dynamic thermal enclosure system through an operable skylight with motorized shades according to an embodiment of the present invention.

In system 100, in periods of extreme differentials between indoor and outdoor temperatures, the insulated roof layer 1, insulated walls 2, insulated floor 3 and enclosed air space layer 8 collectively add up for high performance thermal resistance (see FIG. 3). As shown in FIG. 13, the wall of the dynamic thermal enclosure is provided with an insulating material 25 (e.g., fiberglass batt insulation or rigid board insulation). Similarly, as depicted in FIG. 14, the roof of the dynamic thermal enclosure is provided with an insulating material 26 (e.g., fiberglass batt insulation or rigid board insulation).

In the event that the interior of the dynamic thermal enclosure air 8 is warmer than the exterior ambient temperature reaching a 30 degree temperature differential and the exterior ambient temperature is over 100 degrees, or if the dynamic thermal enclosure air 8 reaches a temperature of over 120 degrees, the exterior windows 4 and skylights 5 in the dynamic thermal enclosure open and the ventilation fan 15 is engaged exhausting the hotter air from the enclosure. With the ventilation fan 15 running, once the temperature in the dynamic thermal enclosure reaches the exterior ambient temperature, the exterior windows 4 and skylights 5 in the thermal enclosure are closed and the interior skylights 6 are opened to exhaust the warmer thermal enclosure air, drawing in cooler interior envelope conditioned air. Once the temperature differential from the thermal enclosure to the interior habitable envelope is 10 degrees, the ventilation fan 15 is turned off and the interior skylight closed to seal the dynamic thermal enclosure from the habitable interior spaces 12. Once sealed the entire dynamic thermal enclosure provides a super-insulated barrier to the exterior ambient air.

Figure 4:
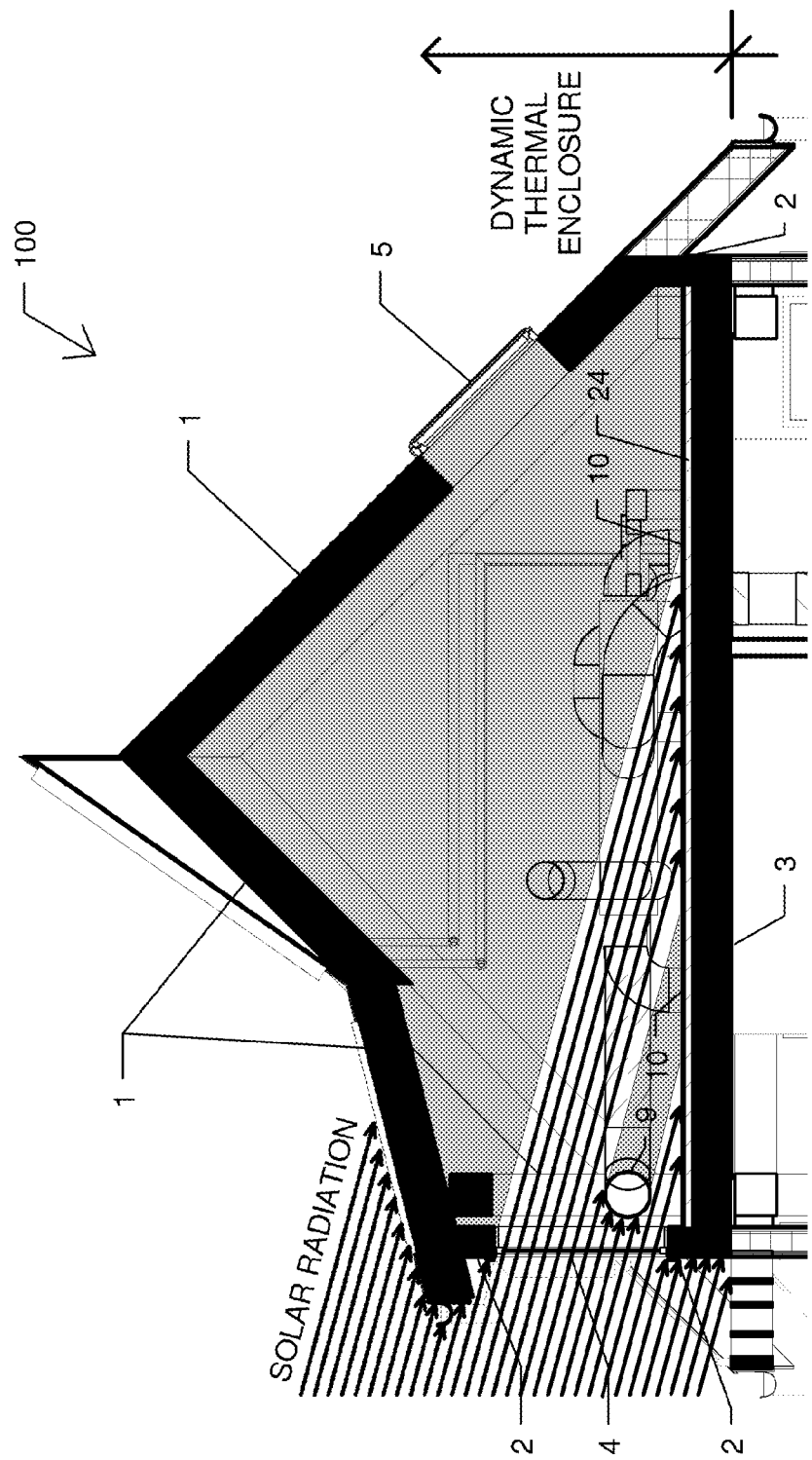
FIG. 4 is a partial transverse sectional view of the dynamic thermal enclosure system according to an embodiment of the present invention with the system being depicted in a heating mode.
Figure 5:
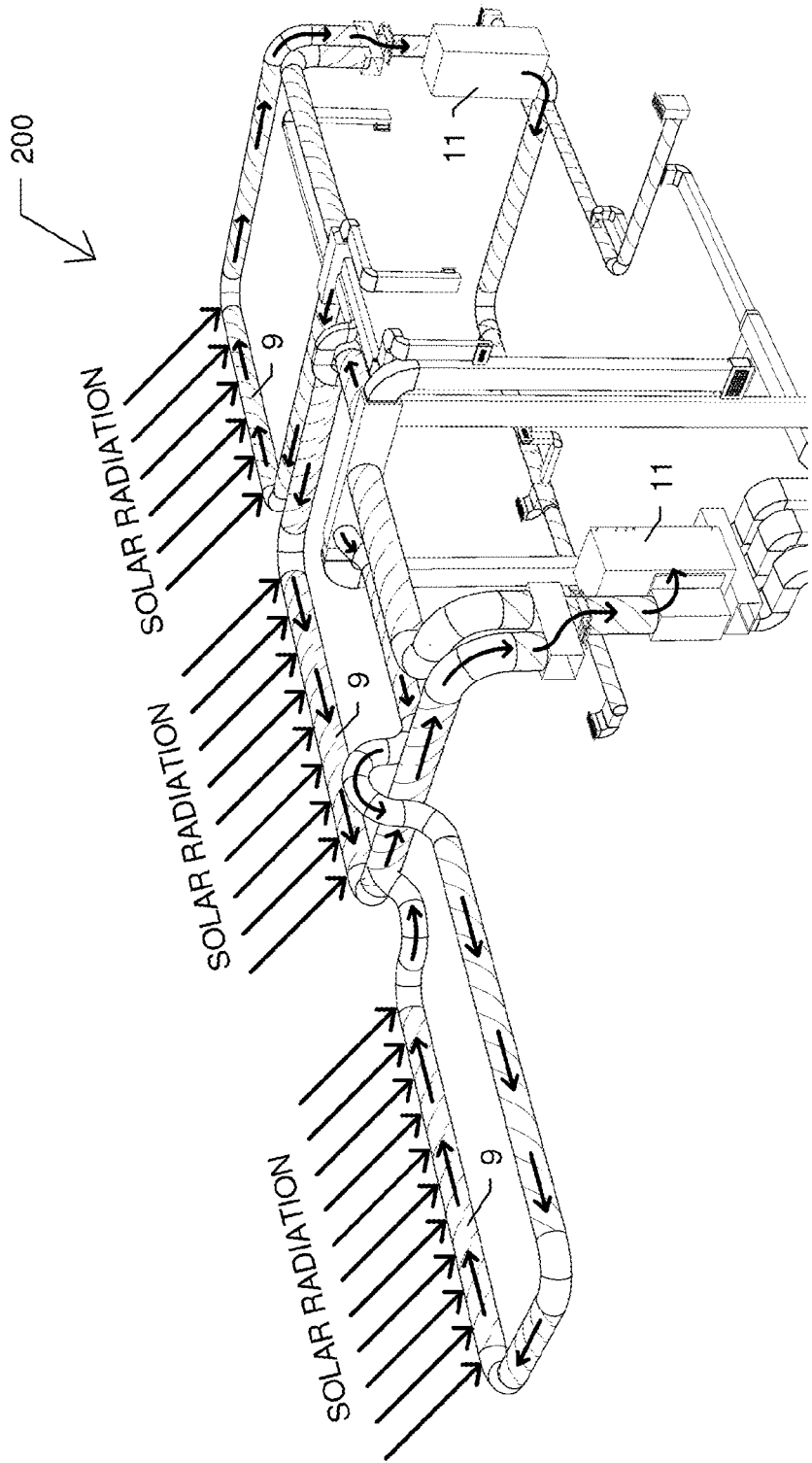
FIG. 5 is a perspective view of a forced air heating and cooling system according to an embodiment of the present invention wherein return air is being heated using the dynamic thermal enclosure.
Figure 6:
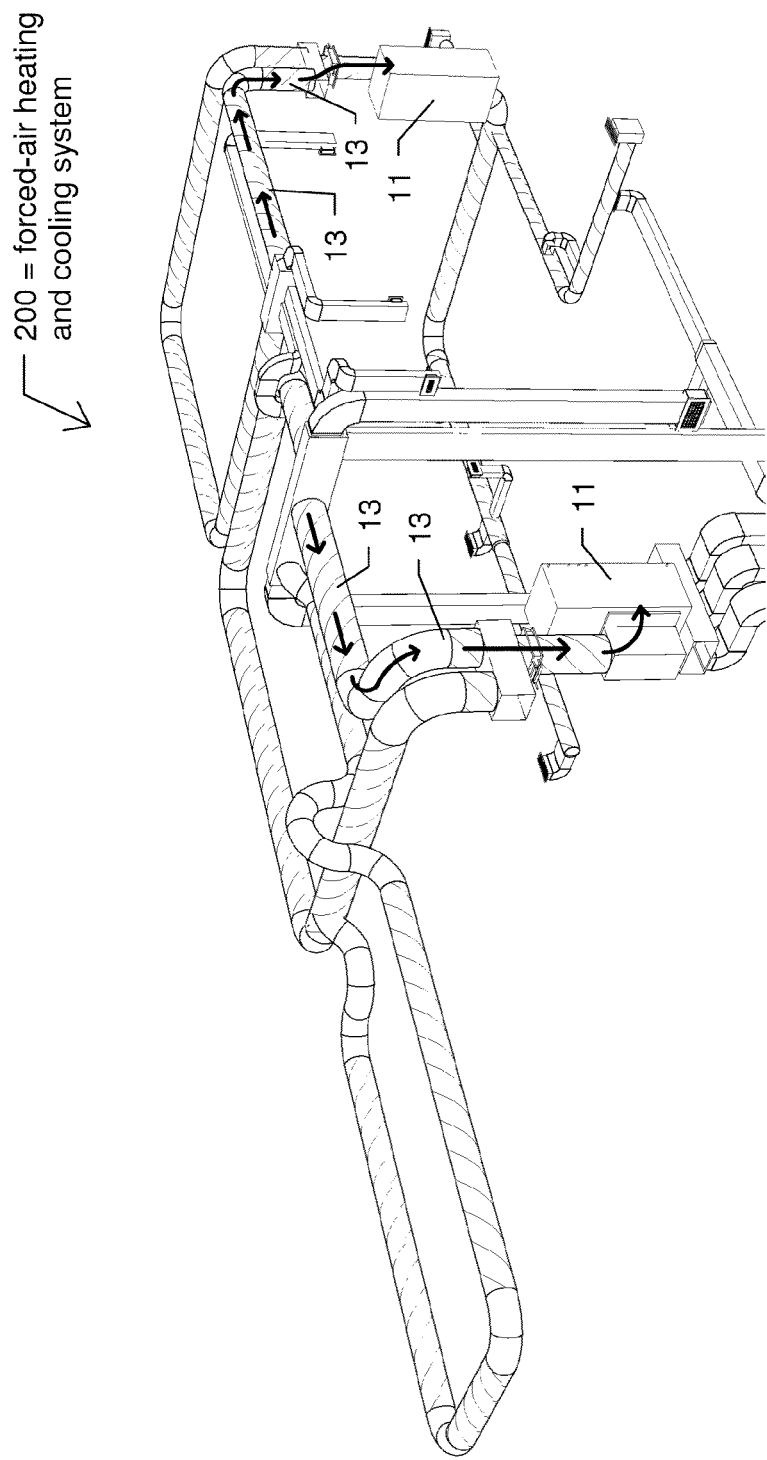
FIG. 6 is a perspective view of a forced air heating and cooling system according to an embodiment of the present invention wherein return air is being directed through the bypass ductwork.

In the heating season, the roof design and "attic" window orientation allows solar radiation to penetrate the enclosure radiantly heating return air ductwork 9 and floor tiles 10, both having surfaces of high solar heat absorption (see FIG. 4). The tiles are placed over a setting bed 24 with a high thermal mass which will release heat for a period of time after the tiles are no longer being heated by solar radiation. In system 100, while the heat gain in the enclosure adds additional thermal protection for the interior habitable spaces and warms the ductwork in the enclosure, the direct solar exposure on the ducts of the forced-air heating and cooling system 200 radiantly heats the return air ductwork and air passing through the duct 9 ahead of the mechanical heating unit 11 (refer to FIGS. 4 and 5). In a preferred embodiment, the return air ductwork is formed using a material that has a high thermal conductivity and is painted with a matte black paint to maximize the heating of the return air conveyed there through. When thermostats 307 in the enclosed space and thermostats 306 in the interior indicate that the interior habitable spaces are warmer than the enclosed thermal enclosure and return duct surface temperature, one or more dampers driven by actuators 305 redirect the return air to a more direct highly insulated duct 13 minimizing temperature loss (see FIG. 6). In order to measure the outdoor, ambient air conditions, an exterior ambient temperature sensor 309 and an exterior ambient humidity sensor 310 are also operatively coupled to the microprocessor based control unit 300 (see FIG. 9). As such, the enthalpy of the ambient outdoor air is capable of being determined and, if desired, compared to the enthalpy of the enclosure air 8, as determined using the readings from the enclosure temperature and humidity sensors 307, 14.

Figure 10:
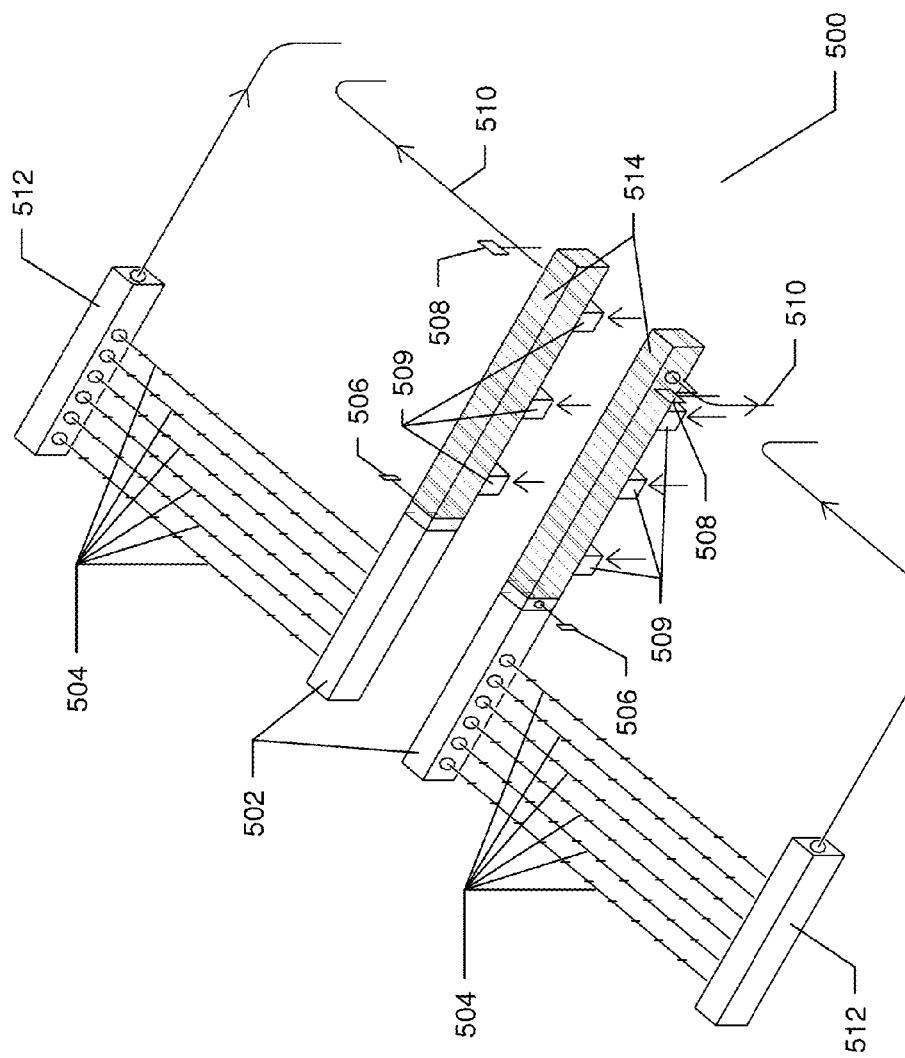
FIG. 10 is an orthographic view of a return air ductwork manifold according to an embodiment of the present invention.
Figure 11:
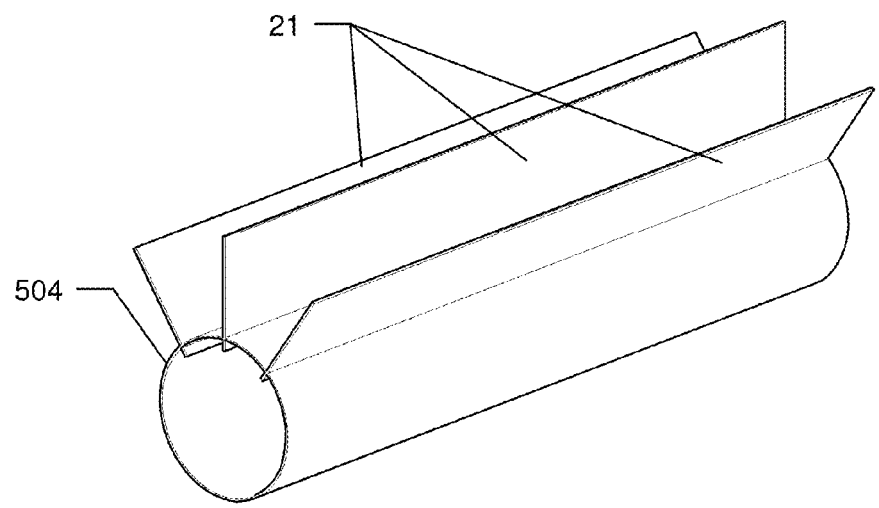
FIG. 11 is an orthographic view of a section of return air ductwork with longitudinally-oriented heat transfer fins according to an embodiment of the present invention.
Figure 12:
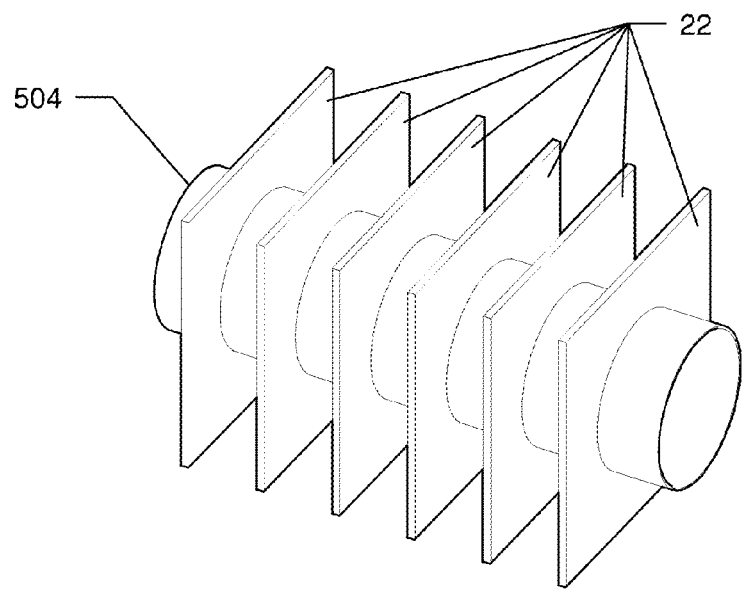
FIG. 12 is an orthographic view of a section of return air ductwork with transversely oriented heat transfer fins according to an embodiment of the present invention.

In an alternative preferred embodiment of the invention, the return air ductwork system is provided in a manifold configuration 500 (see FIG. 10). In particular, each air system comprises a plurality of return air branch ducts 504 that are fluidly connected to, and disposed between, two duct headers 502, 512 in a generally parallel arrangement. Each return air branch duct 504 is preferably provided with a plurality of heat transfer fins 21, 22 either oriented longitudinally along the axis of the ductwork as shown in FIG. 11 or transversely along the axis of the ductwork as shown in FIG. 12, disposed about the periphery thereof so as maximize its effective heat transfer surface area. Also, as shown in FIG. 10, each inwardly disposed duct header 502 (with insulation 514 on a portion thereof, indicated by cross-hatching) is fluidly coupled to an insulated bypass duct 510 which, in turn, is connected to the inlet side of its associated mechanical heating unit 11 (not shown in FIG. 10). One end of each outwardly disposed duct header 512 is fluidly coupled to a circular return air main which, like the bypass duct 510, is connected to the inlet side of its associated mechanical heating/cooling unit 11 (not shown in FIG. 10). A motorized damper 506 is provided in each inwardly disposed duct header 502, and a motorized damper 508 is provided in each bypass duct 510, so that the return air path back to each mechanical heating/cooling unit 11 can be selectively varied.

When the system is operating in a heating mode and the enclosed space 8 is warmer than the habitable interior building spaces 12, the motorized dampers 508 in the bypass ducts 510 are closed, while the motorized dampers 506 in the inwardly disposed duct headers 502 are open. This damper arrangement directs the return air, which is extracted from habitable interior building spaces 12 via space return air ducts 509, then through each plurality of return air branch ducts 504 such that the return air is preheated by solar radiation prior to entering each mechanical heating/cooling unit 11, thereby reducing the heating load on each unit 11. In contrast, when the system is operating in a heating mode and the enclosed space 8 is colder than the habitable interior building spaces 12, the motorized dampers 508 in the bypass ducts 510 are open, while the motorized dampers 506 in the inwardly disposed duct headers 502 are closed. This alternative damper arrangement directs the return air through each bypass duct 510 and to mechanical heating/cooling unit 11 without passing through each plurality of return air branch ducts 504. Advantageously, this alternative routing of the return air stream prevents the undesirable cooling of the return air by an enclosed space 8 that is colder than the air being conveyed by the ductwork system.

Figure 7:
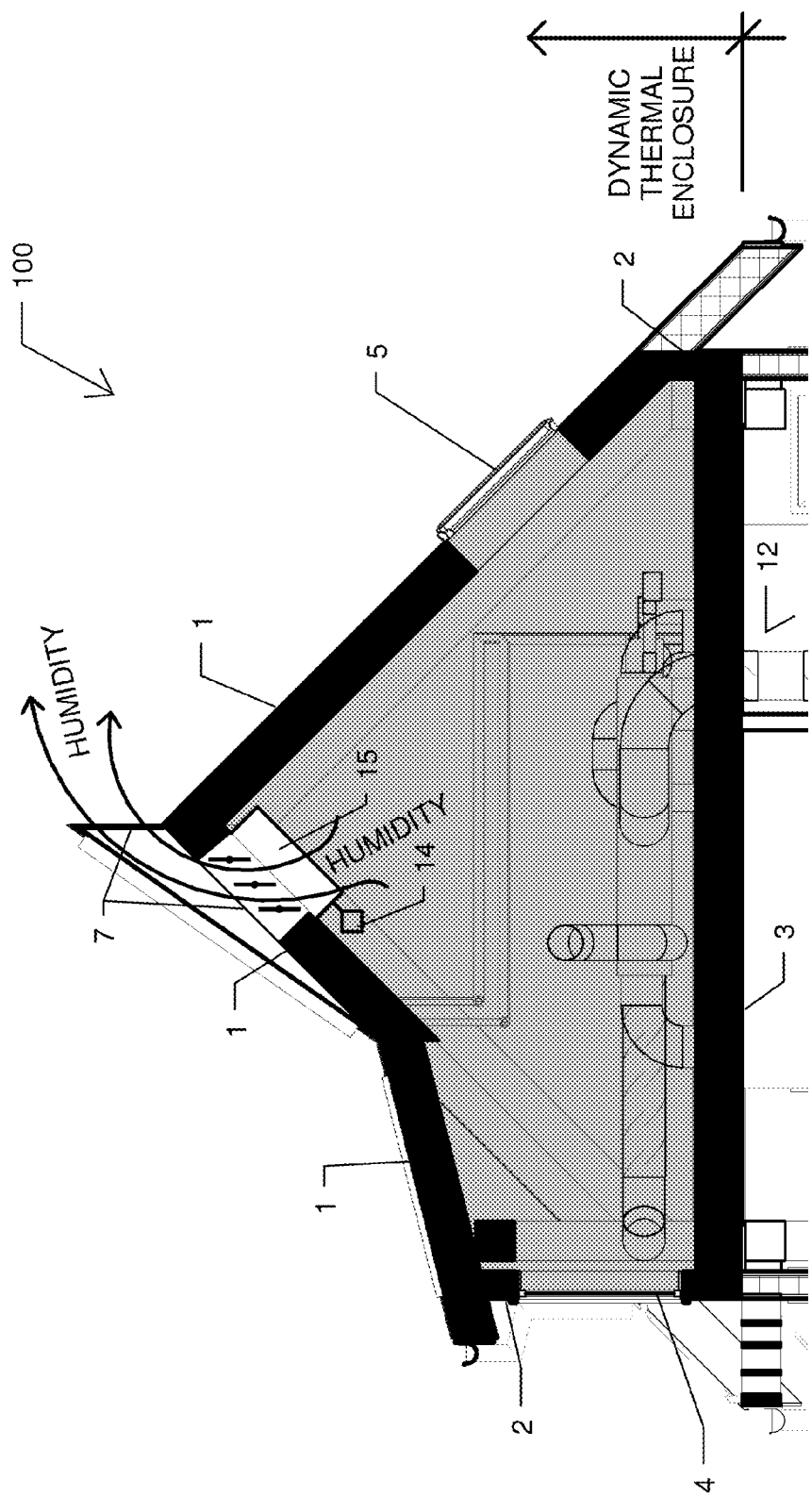
FIG. 7 is a partial transverse sectional view of the dynamic thermal enclosure system according to an embodiment of the present invention with the system being depicted in an excess humidity mode.

In system 100, preferably, the thermal enclosure space is equipped with a humidity sensor 14 which will initiate actions when required to remove excess humidity which in this embodiment is handled through the automatic opening of louvers 7 and the use of a ventilation fan 15 (see FIG. 7). For example, in the event that the dynamic thermal enclosure 8 reaches a relative humidity of 60% or higher in cooling periods, 50% or higher in heating periods or where the dynamic thermal enclosure internal temperature is below the dew point, the ventilation fan 15 to the exterior is activated and the interior skylight 6 opened to expel humidity from the dynamic enclosure. Once the humidity level is reduced to acceptable levels the ventilation fan 15 is turned off and the interior skylights 6 are closed to restore the system to the standard operating mode.

Figure 8:
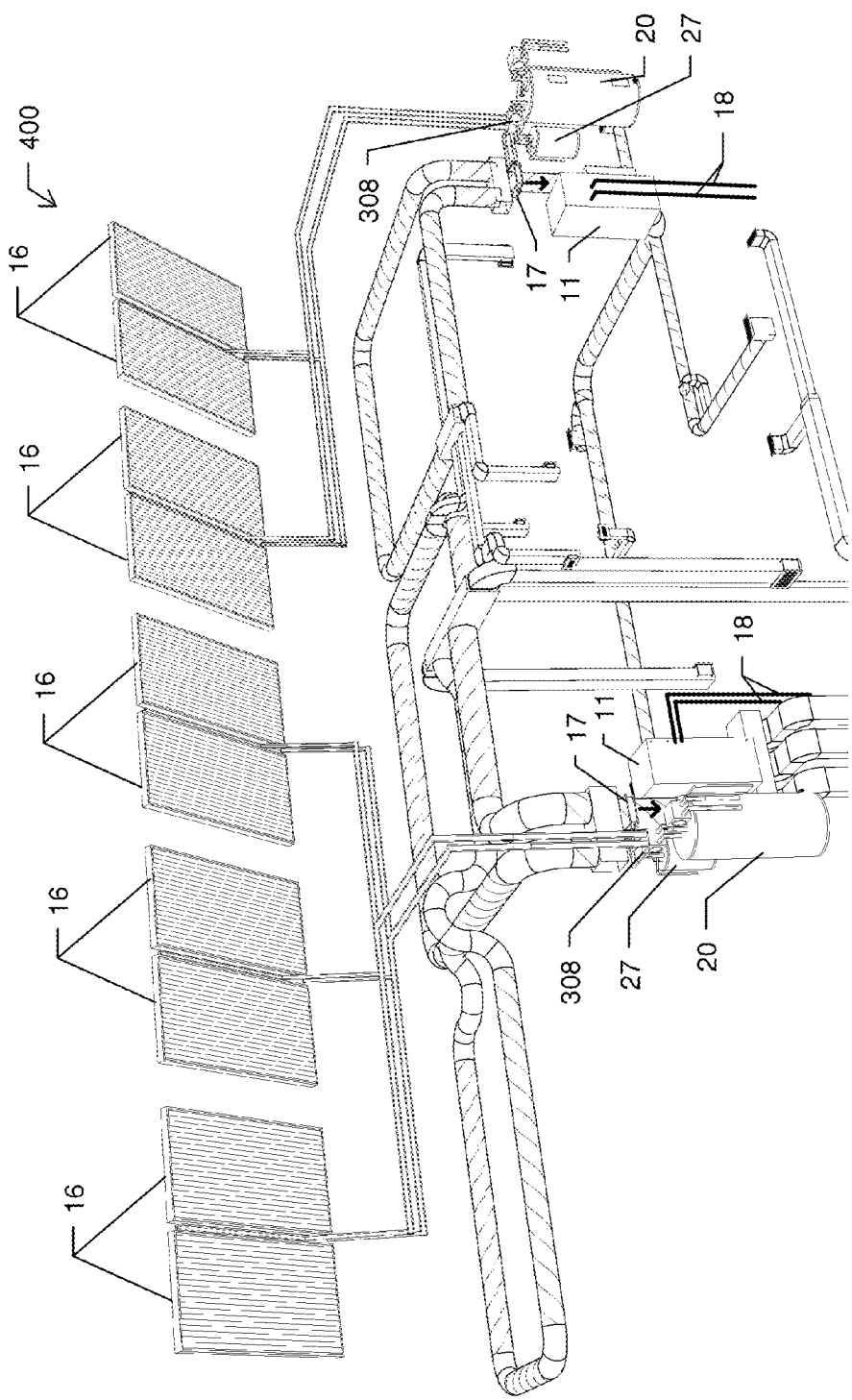
FIG. 8 is a perspective view of the hot water heating system and the forced-air heating and cooling system according to an embodiment of the present invention.
Figure 15:
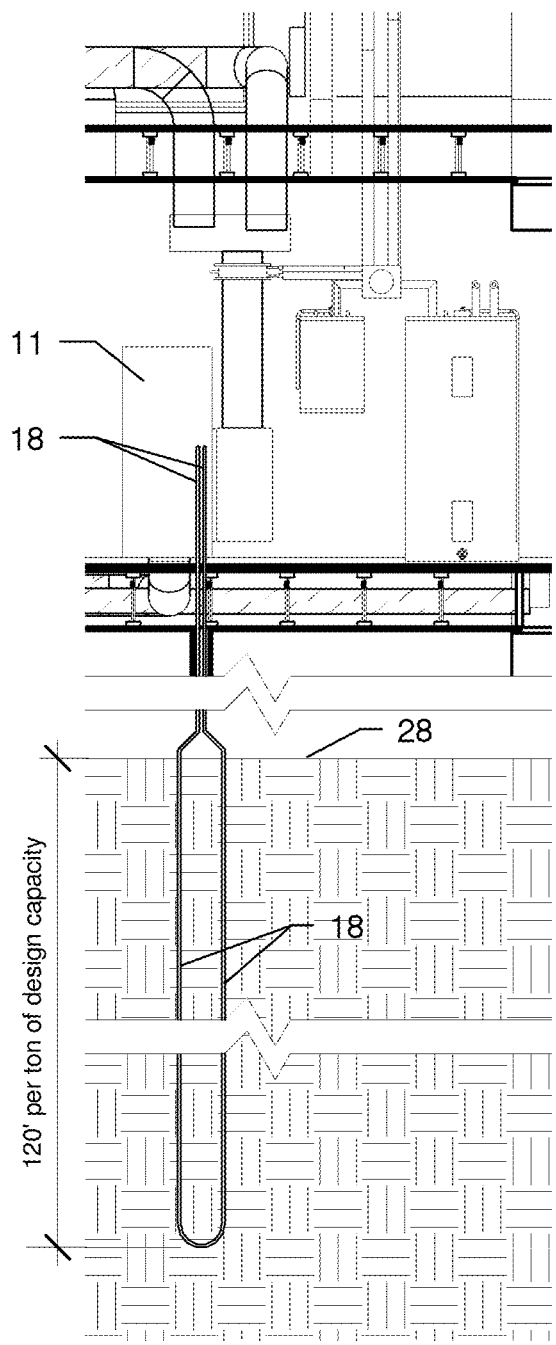
FIG. 15 is a partial sectional view of the heat pump system connected to a deep well geothermal loop system according to an embodiment of the present invention.

As shown in FIG. 8, the preferred solar heat collection system 400 utilizes solar hot water collectors 16 that are fluidly coupled to a solar hot water preheat coil 17 on the return air line upstream of each heating unit 11 to preheat the air. The solar heat collection system 400 is provided with one or more hot water system pumps 308 that are operatively coupled to central microprocessor-based control unit 300. The preheated air reduces the amount of energy needed for the heating unit to reach the desired discharge air temperature. In another preferred embodiment, the dynamic thermal enclosure is combined with a ground source geothermal heat pump system where the heating/cooling unit 11 is a heat pump fluidly coupled to liquid heat transfer loop 18 disposed in the ground 28 (see FIGS. 8 and 15). While the primary advantage would be for cooling periods, the heat transfer system could assist with heating as well.

The preferred embodiments of the dynamic thermal enclosure invention provide numerous advantages over traditional heating and cooling strategies. In typical building applications thermal barriers, whether walls or roofs generally are static in that they provide a uniform thermal resistance regardless of the exterior temperature. In traditional passive solar design, interior surfaces are heated by direct solar radiation warming interior surfaces so that they can slowly release heat during the time periods when the sun is not present. The disadvantage of this traditional approach is that for the thermal surfaces to be used for passive heating purposes the sun must make direct contact. Furniture, rugs and even occupants, naturally low in thermal mass, reduce the efficiency of the solar exposure. The interior spaces can be uncomfortably warm when the sun is heating interior surfaces and the glare from the sun can be hard on the eyes. Solar exposure can also be damaging to interior finishes. Passive solar designs using trombe walls near exterior walls reduce the opportunities for exterior windows and provide very little temperature control. When the trombe walls are moved inboard the spaces heat up like traditional passive designed spaces. Attached greenhouse enclosures can also act as a passive heating element but one must look through them or a view to the exterior is obstructed. While traditional passive solar designs can help with heating they typically do nothing to help cool with the exception of providing roof overhangs which limit the amount of sun entering the building during warmer seasons. The preferred embodiments of the dynamic thermal enclosure system takes a passive solar approach, but instead of the direct heating of interior spaces from the sun, the sun heats an adjacent space whereby the heat is then transferred through controlled measures to the habitable interior spaces. With this approach the interior spaces are comfortable, with uncompromising views to the exterior and without solar intrusion.

In some energy efficient strategies the roof surface is isolated from the insulating layer so that there is little heat transfer from the roof surface to the interior. The preferred embodiments in the dynamic thermal enclosure system use the principles of the roof surface being separated from the insulation layer for periods when a cool roof surface is desired while offering a direct heat inducing enclosure system for periods during heating periods. The preferred embodiment allows the roof system to act as a cool roof or a hot roof depending on specific climatic conditions.

Before the advent of mechanical forced air systems, building designs by necessity utilized natural ventilation. In some climatic regions building forms trap winds to cool interiors. In the preferred embodiments of the dynamic thermal enclosure system, the "attic" windows 4 and roof skylights 5 allow air flow through the enclosed space. By opening the floor skylights 6 the warm air is induced out from the interior by the air displacement in the enclosed space. Through natural convection the warm air exits to the exterior drawing cooler air in through exterior windows.

The embodiments of the invention combine many aspects of differing energy efficient strategies in one dynamic system.

Operation—In heating mode, during daylight hours, the dynamic thermal envelope is self-contained with the "attic" windows 4, roof skylights 5 and dampers connected to louvers 7 closed allowing the insulated roof 1, insulated attic floor 3 and contained air space 8 to work together as a single, super insulated barrier. Solar radiation enters the enclosed space through the insulated "attic" windows 4 and heats return air ductwork 9 preheating air upstream of the forced air heating system while warming the heat absorbing "attic" floor surface 10 heating the air space 8 further benefiting the insulating value of the dynamic thermal enclosure (see FIG. 4). In a preferred embodiment, roof top hot water solar collectors 16 provide heat to a hot water collection/storage tank 20 which in turn provides heated water to a preheat coil 17 on the return air duct upstream of the forced air heating unit 11 providing additional energy savings. When the sun ceases to provide radiant heat, a thermostat in the enclosed space 8 ("attic") measures the temperature and sends information to a central microprocessor based control unit 300 which in turn directs return air via dampers to the perimeter ductwork system 9 when the enclosed air space is warm enough to heat the return air (see FIG. 5) or directs return air to a highly insulated bypass return air duct 13 that is more direct to the heating unit 11 when the enclosed air space 8 temperature would cool the return air (see FIG. 6). In a preferred embodiment the solar hot water tank 20 would continue to supply heated water to the preheat coil 17 as long as the water temperature was warmer than the return air temperature. When the water temperature becomes cooler than the return air temperature, the supply to the preheat coil 17 is shut off. After the thermal enclosure and solar collection tank lose the ability to provide energy efficiency, a preferred embodiment that provides for a heat pump 11 tied to a ground source heat transfer loop 18 provides energy efficient heating to the interior habitable spaces.

Also, as shown in FIG. 8, auxiliary heating units 27 are provided for heating the circulated water when adequate solar radiation is not available. The auxiliary heating units 27 are fluidly coupled to the hot water storage tanks 20 by means of a plurality of hot water pipes. The auxiliary heating units 27 are operatively coupled to the microprocessor-based control unit 300 so that the auxiliary heating units 27 are capable of being automatically activated or deactivated by said microprocessor-based control unit 300.

Operation—In the natural cooling and ventilation mode, the "attic" windows 4 and roof skylights 5 open to allow air flow over the insulated "attic" floor 3 separating the cooler "attic" floor surface from a warmer roof surface providing thermal isolation which helps with cooling (see FIG. 1). If additional air flow is required, insulated dampers connected to louvers 7 open to connect the enclosed "attic" space to the exterior. In a preferred embodiment, a roof top mounted anemometer 19 determines exterior wind speed and direction and sends the information to the central microprocessor based control unit 300 which determines the optimal window, skylight and louver opening and determines if the "attic" ventilation fan 15 is necessary to induce additional air movement. To provide natural ventilation, the "attic" floor skylights 6 open and through "attic" air displacement created by moving air exiting the dynamic thermal enclosure, displaced air draws warm air out of the interior habitable spaces and fresh exterior air in through open windows in the habitable spaces (see FIG. 2). The air movement creates natural convective cooling and, if the air that is drawn in is through windows closer to grade, that would tend to allow cooler air to enter the interior.

Operation—When the exterior temperature measured by an exterior ambient temperature sensor 307 and wind speed measured by a roof top anemometer 19 are such that the natural cooling and ventilation mode would not benefit space conditioning, the cooling mode would rely on the dynamic thermal envelope to be self-contained with the "attic" windows 4, roof skylights 5 and dampers connected to louvers 7 closed allowing the insulated roof 1, insulated attic floor 3 and contained air space 8 to work together as a single, super insulated barrier. In a preferred embodiment, a heat pump connected to a ground source geothermal loop 18 provides energy efficient geothermal cooling. Another preferred embodiment would be for the roof top skylights 5 and the "attic" windows 4 to be equipped with an automated blind system operated by the central microprocessor based control unit to keep any solar radiation from the dynamic thermal enclosure interior space.

Although the invention has been shown and described with respect to a certain embodiment or embodiments, it is apparent that this invention can be embodied in many different forms and that many other modifications and variations are possible without departing from the spirit and scope of this invention.

Moreover, while exemplary embodiments have been described herein, one of ordinary skill in the art will readily appreciate that the exemplary embodiments set forth above are merely illustrative in nature and should not be construed as to limit the claims in any manner. Rather, the scope of the invention is defined only by the appended claims and their equivalents, and not, by the preceding description.

The invention claimed is:

1. An energy-efficient building structure configured to reduce building energy consumption by utilizing solar and wind energy, said energy-efficient building structure comprising:
   a habitable enclosure configured to be inhabited by one or more occupants, said habitable enclosure including a floor, a plurality of walls, and a ceiling;
   a dynamic thermal enclosure disposed above said habitable enclosure such that said dynamic thermal enclosure forms an attic space in said energy-efficient building structure, said dynamic thermal enclosure including a floor, a plurality of walls, and a roof structure, at least one of said plurality of walls and said roof structure being provided with at least one exterior aperture disposed therethrough, said at least one exterior aperture being provided with an operable cover member thereon so that said at least one exterior aperture is capable of being selectively opened and closed, at least a portion of at least one of: (i) said plurality of walls, (ii) said roof structure, and (iii) said operable cover member being formed from a transmissive material that permits the transmission of solar radiation therethrough;
   a partitioning structure separating said habitable enclosure from said dynamic thermal enclosure, said partitioning structure having at least one interior aperture disposed therethrough, said at least one interior aperture being provided with an operable cover member thereon so that said at least one interior aperture is capable of being selectively opened and closed, said at least one interior aperture with said operable cover member comprising one or more operable interior skylight assemblies disposed in said floor of said dynamic thermal enclosure, each of said one or more operable interior skylight assemblies including a respective actuator;
   a plurality of return air ducts disposed in said dynamic thermal enclosure, said plurality of return air ducts fluidly coupled to an air treatment unit that is configured to provide at least heated air to said habitable enclosure; and
   a microprocessor-based control unit, said microprocessor-based control unit being operatively coupled to an actuator of said operable cover member of said at least one exterior aperture and to each said respective actuator of said one or more operable interior skylight assemblies;
   wherein, when operating in a first cooling and ventilating mode, both said operable cover member of said at least one exterior aperture and said one or more operable interior skylight assemblies are commanded open by said microprocessor-based control unit so that said habitable enclosure is capable of fluidly communicating with said dynamic thermal enclosure and said dynamic thermal enclosure is capable of fluidly communicating with said outdoor environment, whereby said habitable enclosure is capable of being ventilated; and
   wherein, when operating in a second heating mode, both said operable cover member of said at least one exterior aperture and said one or more operable interior skylight assemblies are commanded closed by said microprocessor-based control unit such that no appreciable fluid communication between said habitable enclosure and said dynamic thermal enclosure takes place and no appreciable fluid communication between said dynamic thermal enclosure and said outdoor environment takes place, whereby an interior portion of said dynamic thermal enclosure and said plurality of return air ducts disposed therein are capable of being heated by said solar radiation passing through said transmissive material.

2. The energy-efficient building structure according to claim 1, wherein a wall of at least one of said plurality of return air ducts is provided with a plurality of fins disposed thereon so as to increase said wall's overall heat transfer surface area.

3. The energy-efficient building structure according to claim 2, wherein said plurality of fins are circumferentially spaced on said wall of said at least one of said plurality of return air ducts, and said plurality of fins extend in the direction of an airflow passing through said at least one of said plurality of return air ducts so that said plurality of fins do not substantially impede a passage of said airflow therethrough.

4. The energy-efficient building structure according to claim 1, wherein a wall of at least one of said plurality of return air ducts is formed from a material having a high thermal conductivity so as to increase the rate of heat transfer therethrough.

5. The energy-efficient building structure according to claim 1, wherein an exterior surface of a wall of at least one of said plurality of return air ducts is coated with a matte black paint so as to increase the absorption of solar radiation by said wall of said at least one of said plurality of return air ducts.

6. The energy-efficient building structure according to claim 1, wherein said floor of said dynamic thermal enclosure includes a plurality of floor tiles disposed over a setting bed having a high thermal mass so that said floor of said dynamic thermal enclosure is capable of releasing heat for a period of time after a direct heating of said floor tiles by said solar radiation has ceased.

7. The energy-efficient building structure according to claim 6, wherein at least one of said plurality of return air ducts is disposed above, and proximate to, said plurality of floor tiles so that said at least one of said plurality of return air ducts is capable of being heated by said plurality of floor tiles.

8. The energy-efficient building structure according to claim 1, further comprising a solar heat collection system that includes:
- a hot water preheat coil disposed in at least one of said plurality of return air ducts located upstream of said air treatment unit, said hot water preheat coil being configured to preheat the air in said at least one of said plurality of return air ducts so as to reduce the heating load on said air treatment unit;
- at least one hot water solar panel disposed above at least one of: (i) said dynamic thermal enclosure and (ii) said habitable enclosure, said at least one hot water solar panel fluidly coupled to said hot water preheat coil by means of a plurality of hot water pipes; and
- a hot water pump fluidly coupled to said plurality of hot water pipes, said hot water pump being configured to circulate water through said hot water preheat coil, said plurality of hot water pipes, and said at least one hot water solar panel;
- wherein said hot water pump is operatively coupled to said microprocessor-based control unit so that said solar heat collection system is capable of being automatically activated or deactivated by said microprocessor-based control unit.

9. The energy-efficient building structure according to claim 8, wherein said solar heat collection system further comprises:
- a hot water storage tank for storing water heated by said at least one hot water solar panel, said hot water storage tank fluidly coupled to said at least one hot water solar panel by means of said plurality of hot water pipes; and
- an auxiliary heating unit for heating said water when adequate solar radiation is not available, said auxiliary heating unit fluidly coupled to said hot water storage tank by means of said plurality of hot water pipes;
- wherein said auxiliary heating unit is operatively coupled to said microprocessor-based control unit so that said auxiliary heating unit is capable of being automatically activated or deactivated by said microprocessor-based control unit.

10. The energy-efficient building structure according to claim 1, wherein said at least one exterior aperture with said operable cover member comprises one or more operable window assemblies in one of said plurality of walls of said dynamic thermal enclosure and one or more operable exterior skylight assemblies in said roof structure of said dynamic thermal enclosure, each of said one or more operable window assemblies and each of said one or more operable exterior skylight assemblies including a transmissive material that permits the transmission of solar radiation therethrough and respective actuators that are operatively coupled to said microprocessor-based control unit.

11. The energy-efficient building structure according to claim 1, further comprising an anemometer mounted on said roof structure of said dynamic thermal enclosure, said anemometer being configured to determine exterior wind speed and direction, and said anemometer being operatively coupled to said microprocessor-based control unit.

12. The energy-efficient building structure according to claim 11, wherein said microprocessor-based control unit is configured to use said exterior wind speed and said direction determined by said anemometer in order to calculate an opening percentage of said one or more operable window assemblies and said one or more operable exterior skylight assemblies, and said microprocessor-based control unit is further configured to utilize said calculated opening percentage to control said respective actuators of said one or more operable window assemblies and said one or more operable exterior skylight assemblies.

13. The energy-efficient building structure according to claim 10, wherein said one or more operable window assemblies and said one or more operable exterior skylight assemblies each comprise motorized shades disposed over said transmissive material, said motorized shades being operatively coupled to said microprocessor-based control unit so that the passage of solar radiation through said one or more operable window assemblies and said one or more operable exterior skylight assemblies is capable of being selectively regulated.

14. The energy-efficient building structure according to claim 1, wherein said floor, said plurality of walls, and said roof structure of said dynamic thermal enclosure each comprise an insulating material having a high thermal resistance so as to substantially reduce the rate of heat transfer therethrough.

15. The energy-efficient building structure according to claim 14, further comprising:
- an interior temperature sensor disposed in said dynamic thermal enclosure, said interior temperature sensor being configured to sense an interior temperature of said dynamic thermal enclosure, said interior temperature sensor being operatively coupled to said microprocessor-based control unit; and
- an outdoor temperature sensor disposed in said outdoor environment, said outdoor temperature sensor being configured to sense an ambient temperature of said outdoor environment, said outdoor temperature sensor being operatively coupled to said microprocessor-based control unit;
- wherein, when a substantial temperature differential exists between said sensed interior temperature and said sensed ambient temperature, said microprocessor-based control unit initiates a third extreme temperature differential mode in which said operable cover member of said at least one exterior aperture and said one or more operable interior skylight assemblies are commanded closed by said microprocessor-based control unit such that no appreciable fluid communication between said habitable enclosure and said dynamic thermal enclosure takes place and no appreciable fluid communication between said dynamic thermal enclosure and said outdoor environment takes place, thereby enabling said insulated floor, walls, and roof structure of said dynamic thermal enclosure and the air space defined thereby to form an aggregate thermal resistance assembly that substantially impedes the transfer of heat between said habitable enclosure and said outdoor environment.

16. The energy-efficient building structure according to claim 15, further comprising a ventilation system for automatically ventilating said dynamic thermal enclosure, said ventilation system including:
- an interior humidity sensor disposed in said dynamic thermal enclosure, said interior humidity sensor being configured to sense an interior humidity level of said dynamic thermal enclosure, said interior humidity sensor being operatively coupled to said microprocessor-based control unit;
- at least one operable louver disposed in one of said plurality of walls and said roof structure, said at least one operable louver containing an insulating material and being operatively coupled to at least one actuator, said at least one actuator being operatively coupled to said microprocessor-based control unit; and a ventilation fan disposed in said dynamic thermal enclosure upstream of said at least one operable louver, said ventilation fan being configured to discharge air from said dynamic thermal enclosure through said at least one operable louver to said outdoor environment, said ventilation fan being operatively coupled to said microprocessor-based control unit;

wherein, when said interior temperature sensor detects a temperature in said dynamic thermal enclosure that exceeds a predetermined threshold, said microprocessor-based control unit initiates a fourth excess temperature mode in which said at least one operable louver is commanded open and said ventilation fan is activated, thereby discharging air from said dynamic thermal enclosure so as to cool the interior thereof; and wherein, when said interior humidity sensor detects a humidity level in said dynamic thermal enclosure that exceeds a predetermined threshold, said microprocessor-based control unit initiates a fifth excess humidity mode in which said at least one operable louver is commanded open and said ventilation fan is activated, thereby discharging moisture-laden air from said dynamic thermal enclosure so as to reduce said humidity level of said dynamic thermal enclosure.

17. The energy-efficient building structure according to claim 1, wherein said air treatment unit is in the form of a geothermal heat pump unit that is configured to both heat and cool said habitable enclosure, said geothermal heat pump unit being fluidly coupled to a liquid heat transfer loop, wherein a substantial portion of said liquid heat transfer loop is disposed underground.

18. The energy-efficient building structure according to claim 1, wherein at least some of said plurality of return air ducts disposed in said dynamic thermal enclosure are disposed in a manifold arrangement, said manifold arrangement including a plurality of return air branch ducts that are fluidly connected to, and disposed between, two duct headers in a generally parallel configuration.

19. The energy-efficient building structure according to claim 1, wherein said plurality of return air ducts disposed in said dynamic thermal enclosure include:
one or more uninsulated ducts disposed in the path of said solar radiation passing through said transmissive material;
one or more insulated bypass ducts disposed generally outside said path of said solar radiation passing through said transmissive material;
a first damper disposed in one of said uninsulated ducts, said first damper including a first damper actuator that is operatively coupled to said microprocessor-based control unit; and
a second damper disposed in one of said insulated bypass ducts, said second damper including a second damper actuator that is operatively coupled to said microprocessor-based control unit;
wherein, when a sensed interior temperature of said dynamic thermal enclosure is lower than a sensed interior temperature of said habitable enclosure, said first damper is commanded closed by said microprocessor-based control unit and said second damper is commanded open by said microprocessor-based control unit, thereby directing the return air of said air treatment unit through said one or more insulated bypass ducts so as to minimize a decrease in the return air temperature.

20. An energy-efficient building structure configured to reduce building energy consumption by utilizing solar and wind energy, said energy-efficient building structure comprising:
a habitable enclosure configured to be inhabited by one or more occupants, said habitable enclosure including a floor, a plurality of walls, and a ceiling;
a dynamic thermal enclosure disposed adjacent to said habitable enclosure, said dynamic thermal enclosure including a floor, a plurality of walls, and a roof structure, at least one of said plurality of walls and said roof structure being provided with at least one exterior aperture disposed therethrough, said at least one exterior aperture being provided with an operable cover member thereon so that said at least one exterior aperture is capable of being selectively opened and closed, at least a portion of at least one of: (i) said plurality of walls, (ii) said roof structure, and (iii) said operable cover member being formed from a transmissive material that permits the transmission of solar radiation therethrough;
a partitioning structure separating said habitable enclosure from said dynamic thermal enclosure, said partitioning structure having at least one interior aperture disposed therethrough, said at least one interior aperture being provided with an operable cover member thereon so that said at least one interior aperture is capable of being selectively opened and closed;
a microprocessor-based control unit, said microprocessor-based control unit being operatively coupled to an actuator of said operable cover member of said at least one exterior aperture and to an actuator of said operable cover member of said at least one interior aperture; and
a plurality of return air ducts disposed in said dynamic thermal enclosure, said plurality of return air ducts fluidly coupled to an air treatment unit that is configured to provide at least heated air to said habitable enclosure, said plurality of return air ducts disposed in said dynamic thermal enclosure including:
one or more uninsulated ducts disposed in the path of said solar radiation passing through said transmissive material;
one or more insulated bypass ducts disposed generally outside said path of said solar radiation passing through said transmissive material;
a first damper disposed in one of said uninsulated ducts, said first damper including a first damper actuator that is operatively coupled to said microprocessor-based control unit; and
a second damper disposed in one of said insulated bypass ducts, said second damper including a second damper actuator that is operatively coupled to said microprocessor-based control unit;
wherein, when a sensed interior temperature of said dynamic thermal enclosure is lower than a sensed interior temperature of said habitable enclosure, said first damper is commanded closed by said microprocessor-based control unit and said second damper is commanded open by said microprocessor-based control unit, thereby directing the return air of said air treatment unit through said one or more insulated bypass ducts so as to minimize a decrease in the return air temperature;
wherein, when operating in a first cooling and ventilating mode, both said operable cover member of said at least one exterior aperture and said operable cover member of said at least one interior aperture are commanded open by said microprocessor-based control unit so that said habitable enclosure is capable of fluidly communicating with said dynamic thermal enclosure and said dynamic thermal enclosure is capable of fluidly communicating with said outdoor environment, whereby said habitable enclosure is capable of being ventilated; and wherein, when operating in a second heating mode, both said operable cover member of said at least one exterior aperture and said operable cover member of said at least one interior aperture are commanded open by said microprocessor-based control unit such that no appreciable fluid communication between said habitable enclosure and said dynamic thermal enclosure takes place and no appreciable fluid communication between said dynamic thermal enclosure and said outdoor environment takes place, whereby an interior portion of said dynamic thermal enclosure and said plurality of return air ducts disposed therein are capable of being heated by said solar radiation passing through said transmissive material.

21. An energy-efficient building structure configured to reduce building energy consumption by utilizing solar and wind energy, said energy-efficient building structure comprising:

a habitable enclosure configured to be inhabited by one or more occupants, said habitable enclosure including a floor, a plurality of walls, and a ceiling;

a dynamic thermal enclosure disposed adjacent to said habitable enclosure, said dynamic thermal enclosure including a floor, a plurality of walls, and a roof structure, at least one of said plurality of walls and said roof structure being provided with at least one exterior aperture disposed therethrough, said at least one exterior aperture being provided with an operable cover member thereon so that said at least one exterior aperture is capable of being selectively opened and closed, at least a portion of at least one of: (i) said plurality of walls, (ii) said roof structure, and (iii) said operable cover member being formed from a transmissive material that permits the transmission of solar radiation therethrough;

a partitioning structure separating said habitable enclosure from said dynamic thermal enclosure, said partitioning structure having at least one interior aperture disposed therethrough, said at least one interior aperture being provided with an operable cover member thereon so that said at least one interior aperture is capable of being selectively opened and closed;

a plurality of return air ducts disposed in said dynamic thermal enclosure, said plurality of return air ducts fluidly coupled to an air treatment unit that is configured to provide at least heated air to said habitable enclosure;

a solar heat collection system including:

a hot water preheat coil disposed in at least one of said plurality of return air ducts located upstream of said air treatment unit, said hot water preheat coil being configured to preheat the air in said at least one of said plurality of return air ducts so as to reduce the heating load on said air treatment unit;

at least one hot water solar panel disposed above at least one of: (i) said dynamic thermal enclosure and (ii) said habitable enclosure, said at least one hot water solar panel fluidly coupled to said hot water preheat coil by means of a plurality of hot water pipes; and a hot water pump fluidly coupled to said plurality of hot water pipes, said hot water pump being configured to circulate water through said hot water preheat coil, said plurality of hot water pipes, and said at least one hot water solar panel; and a microprocessor-based control unit, said microprocessor-based control unit being operatively coupled to an actuator of said operable cover member of said at least one exterior aperture, an actuator of said operable cover member of said at least one interior aperture, and to said hot water pump;

wherein said solar heat collection system is capable of being automatically activated or deactivated by said microprocessor-based control unit;

wherein, when operating in a first cooling and ventilating mode, both said operable cover member of said at least one exterior aperture and said operable cover member of said at least one interior aperture are commanded open by said microprocessor-based control unit so that said habitable enclosure is capable of fluidly communicating with said dynamic thermal enclosure and said dynamic thermal enclosure is capable of fluidly communicating with said outdoor environment, whereby said habitable enclosure is capable of being ventilated; and wherein, when operating in a second heating mode, both said operable cover member of said at least one exterior aperture and said operable cover member of said at least one interior aperture are commanded closed by said microprocessor-based control unit such that no appreciable fluid communication between said habitable enclosure and said dynamic thermal enclosure takes place and no appreciable fluid communication between said dynamic thermal enclosure and said outdoor environment takes place, whereby an interior portion of said dynamic thermal enclosure and said plurality of return air ducts disposed therein are capable of being heated by said solar radiation passing through said transmissive material.

* * * * *